(12) United States Patent
Nakajima (10) Patent No.: US 10,103,642 B2
(45) Date of Patent: Oct. 16, 2018

(54) POWER SUPPLY DEVICE

(71) Applicants: Futaba Corporation, Mobara-shi, Chiba-ken (JP); O.S. ENGINES MFG. CO., LTD., Osaka-shi, Osaka (JP)

(72) Inventor: Motoi Nakajima, Osaka (JP)

(73) Assignee: FUTABA CORPORATION, Osaka (JP)

(*) Notice: Subject to any disclaimer, the term of this patent is extended or adjusted under 35 U.S.C. 154(b) by 0 days.

(21) Appl. No.: 15/599,493

(22) Filed: May 19, 2017

(65) Prior Publication Data

US 2017/0338747 A1    Nov. 23, 2017

(30) Foreign Application Priority Data

May 23, 2016 (JP) ................................ 2016-102183

(51) Int. Cl.
G05F 1/40 (2006.01)
H02M 7/06 (2006.01)
(Continued)

(52) U.S. Cl.
CPC ............. *H02M 7/06* (2013.01); *H02J 7/0052* (2013.01); *H02J 7/245* (2013.01); *H02M 1/08* (2013.01);
(Continued)

(58) Field of Classification Search
CPC ...... H02M 1/4225; H02M 1/32; H02M 3/335; H02M 3/156; Y02B 70/126
(Continued)

(56) References Cited

U.S. PATENT DOCUMENTS 6,366,476 B1 * 4/2002 Yasumura ......... H02M 3/33569
                                                       363/21.02
6,944,034 B1 * 9/2005 Shteynberg ......... H02M 1/4258
                                                       323/282
(Continued)

FOREIGN PATENT DOCUMENTS

JP    S61-293159 A    12/1986
JP    H03-078469 A     4/1991

OTHER PUBLICATIONS

Japanese Office Action dated Apr. 17, 2018 issued in corresponding Japanese Patent Application No. 2016-102183 and English translation thereof.
Korean Office Action dated May 17, 2018 issued in corresponding Korean Patent Application No. 10-2017-0062922 and English translation thereof.
Hisahito Endo et al., A high-power-factor buck converter dated Jul. 3, 1992, Power Electronics Specialists Conference, 1992. PESC '92 Record., 23rd Annual IEEE, vo.2, pp. 1071-1076.

*Primary Examiner* — Rajnikant Patel
(74) *Attorney, Agent, or Firm* — Bacon & Thomas, PLLC (57) ABSTRACT

A power supply device includes a rectifying unit for rectifying an AC input voltage, a voltage conversion unit including a switching element and configured to receive a rectified input voltage from the rectifying unit and obtain an output voltage voltage-converted by a switching operation of the switching element, and a voltage comparison unit configured to generate a comparison signal between the output voltage and a set output voltage. The power supply device further includes an oscillation unit configured to output a control signal having an oscillation period and an oscillation-stop period as a control signal for controlling an ON/OFF of the switching element. The oscillation period and the oscillation-stop period of the control signal are controlled by the comparison signal outputted from the voltage comparison unit, and a pulse duty ratio of the control signal in the oscillation period is variably controlled based on the input voltage.

8 Claims, 5 Drawing Sheets

(51) Int. Cl.
*H02J 7/00* (2006.01)
*H02M 1/084* (2006.01)
*H02M 3/335* (2006.01)
*H02M 1/08* (2006.01)
*H02M 3/156* (2006.01)
*H02J 7/24* (2006.01)

(52) U.S. Cl.
CPC ........... *H02M 1/084* (2013.01); *H02M 3/156* (2013.01); *H02M 3/33507* (2013.01); *Y02T 10/92* (2013.01)

(58) Field of Classification Search
USPC ......... 363/16–20, 21.02, 21.04, 95, 98, 127; 323/205, 207, 222, 224, 271, 276, 323/282–290
See application file for complete search history.

(56) References Cited

U.S. PATENT DOCUMENTS

| | | | |
|---|---|---|---|
| 7,054,167 B2* | 5/2006 | Yasumura ........... | H02M 1/4258 323/207 |
| 8,624,572 B2* | 1/2014 | Hosotani ............. | H02M 3/3376 323/272 |
| 8,669,751 B2* | 3/2014 | Balakrishnan .... | H02M 3/33507 323/283 |
| 2011/0002147 A1* | 1/2011 | Fukui ................ | H02M 3/33507 363/21.12 |

* cited by examiner

POWER SUPPLY DEVICE

FIELD OF THE INVENTION

The present disclosure relates to a power supply device which is applicable as an AC/DC converter.

BACKGROUND OF THE INVENTION

In a power generation using, e.g., a small-sized engine, a generator using a permanent magnet is used to generate alternating-current electricity. In this case, since the voltage thus generated is high or low depending on a rotational speed (RPM) of the engine, a shunt regulator is additionally used if necessary. However, when an output voltage is adjusted by the shunt regulator, a surplus power is always discharged as thermal energy, which leads to a waste of power. This wasteful control can be avoided by using an AC/DC converter. Japanese Patent Application Publication No. H01-148072 (JP H01-148072A) discloses an AC/DC converter for an AC input, which includes a rectifying circuit, a smoothing circuit, and a DC/DC converter.

In this regard, there may be employed an AC/DC converter that can be used as a regulator rectifier. Specifically, this is an AC/DC converter that receives an AC input generated by a generator using an engine rotation to obtain a stabilized DC output.

However, the conventional AC/DC converter has the following problems when it is used as the regulator rectifier.

In general, the regulator rectifier requires an input range from AC 0 V to AC 100 V or more, but, in this case, the load on the peripheral elements becomes large when a voltage control is performed only by a conventional PWM control. Therefore, there is a demand for an AC/DC converter which is suitable for a wide range of the input voltages.

In addition, a more stable output voltage is required to overcome a difficulty in achieving a desired control accuracy of the output voltage.

In view of the above, embodiments of the present disclosure provide a power supply device applicable as an AC/DC converter, which is configured to suitably respond to a wide range of input voltages and has a high output voltage accuracy.

SUMMARY OF THE INVENTION

In accordance with an embodiment of the present disclosure, there is provided a power supply device including: a rectifying unit configured to rectify an AC input voltage; a voltage conversion unit including a switching element and configured to receive a rectified input voltage from the rectifying unit and obtain an output voltage voltage-converted by a switching operation of the switching element; a voltage comparison unit configured to generate a comparison signal between the output voltage and a set output voltage; and an oscillation unit configured to output a control signal having an oscillation period and an oscillation-stop period as a control signal for controlling an ON/OFF of the switching element. The oscillation period and the oscillation-stop period of the control signal are controlled by the comparison signal outputted from the voltage comparison unit, and a pulse duty ratio of the control signal in the oscillation period is variably controlled based on the input voltage.

That is, the control signal of the switching element is controlled such that the oscillation period is controlled in response to the output voltage and the pulse duty ratio is controlled in response to the input voltage. Thus, it is possible to suitably respond to the wide range of the input voltages.

In the power supply device described above, when the output voltage exceeds the set output voltage, the voltage comparison unit may output the comparison signal to cause the control signal of the oscillation unit to be in a state of the oscillation-stop period, and the switching element may be controlled to be turned off in the oscillation-stop period.

With such configuration, the output voltage can be stabilized to the set output voltage.

In the power supply device described above, the oscillation unit may include a comparator which is configured to compare an oscillation signal determined by an oscillation time constant circuit with a threshold to output a rectangular wave oscillation signal as a control signal during the oscillation period, and when the output voltage exceeds the set output voltage, the comparison signal may serve as a signal for setting an input terminal of the oscillation signal of the comparator to a lower potential than an input terminal of the threshold of the comparator.

In this configuration in which the control signal is outputted by the comparator which compares the output of the time constant circuit and the threshold, the oscillation output is stopped by setting the input terminal of the oscillation signal to a potential lower than the input terminal of the threshold.

In the power supply device described above, the oscillation unit may include a comparator which is configured to compare an oscillation signal determined by an oscillation time constant circuit with a threshold to output a rectangular wave oscillation signal as a control signal during the oscillation period, and the oscillation unit may variably control the pulse duty ratio in the oscillation period of the control signal by changing the threshold based on the input voltage.

With such configuration, it becomes possible to make it easier to control the pulse duty ratio according to the input voltage.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, an AC/DC converter as an embodiment of a power supply device of the present disclosure will be described in detail with reference to the accompanying drawings.

Figure 1:
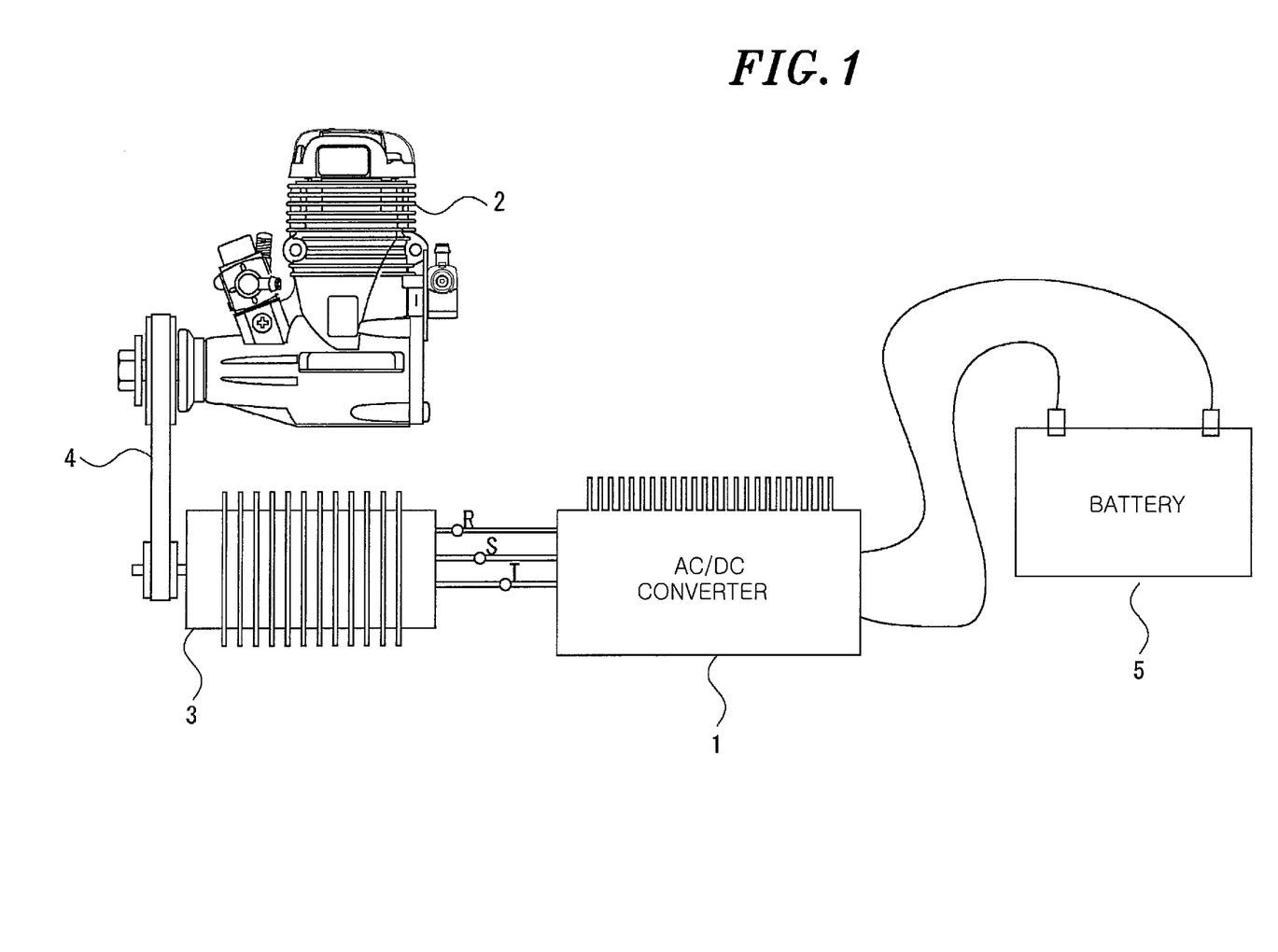
FIG. 1 is an explanatory view of a power generation system including an AC/DC converter according to an embodiment of the present disclosure.

FIG. 1 shows an example of a power generation system including an AC/DC converter 1 according to the embodiment.

The power generation system is an example of a system in which a DC voltage for charging a battery 5 is obtained by a power generation engine 2, a generator 3, and the AC/DC converter 1.

A rotation of the power generation engine 2 is transmitted to a shaft of the generator 3 by means of a belt 4. The generator 3 utilizes the transmitted rotational force to generate a power by, e.g., a power generation method using permanent magnets.

An output of the generator 3 is an AC voltage, and a single-phase output or a three-phase output can be selected as the output of the generator 3. The generator 3 outputs a voltage proportional to the rotational speed (RPM) of the shaft of the generator 3. Therefore, a voltage proportional to the rotational speed of the power generation engine 2 is outputted. In the present embodiment, description will be made assuming that an AC voltage of three phases (R-phase, S-phase and T-phase) is outputted.

The AC/DC converter 1 initiates all operations using a power outputted from the generator 3. An input voltage of the AC/DC converter 1 according to the present embodiment ranges from 0 V to a high voltage of AC 100 V or more.

The output voltage from the AC/DC converter 1 is used for charging the battery 5. However, it may be applicable to other operations of various electrical devices.

The power generation system described above may be mounted on, e.g., a radio-controlled flying object (a radio-controlled helicopter or other flying object), a vehicle, or the like.

In the above case, an engine for driving rotor blades for flight or an engine for a vehicle driving may be used as the power generation engine 2. The output of the AC/DC converter 1 and the output voltage from the battery 5 may be used as operation voltages of electrical components mounted to the flying object, such as a radio receiver, a camera, a motor of a gimbal (camera mounting mechanism) and the like.

Further, it is also conceivable to use the output voltage of the AC/DC converter 1 or the output voltage from the battery 5 as a power source of a motor for driving rotor blades for flight or a motor for a vehicle driving.

Figure 2:
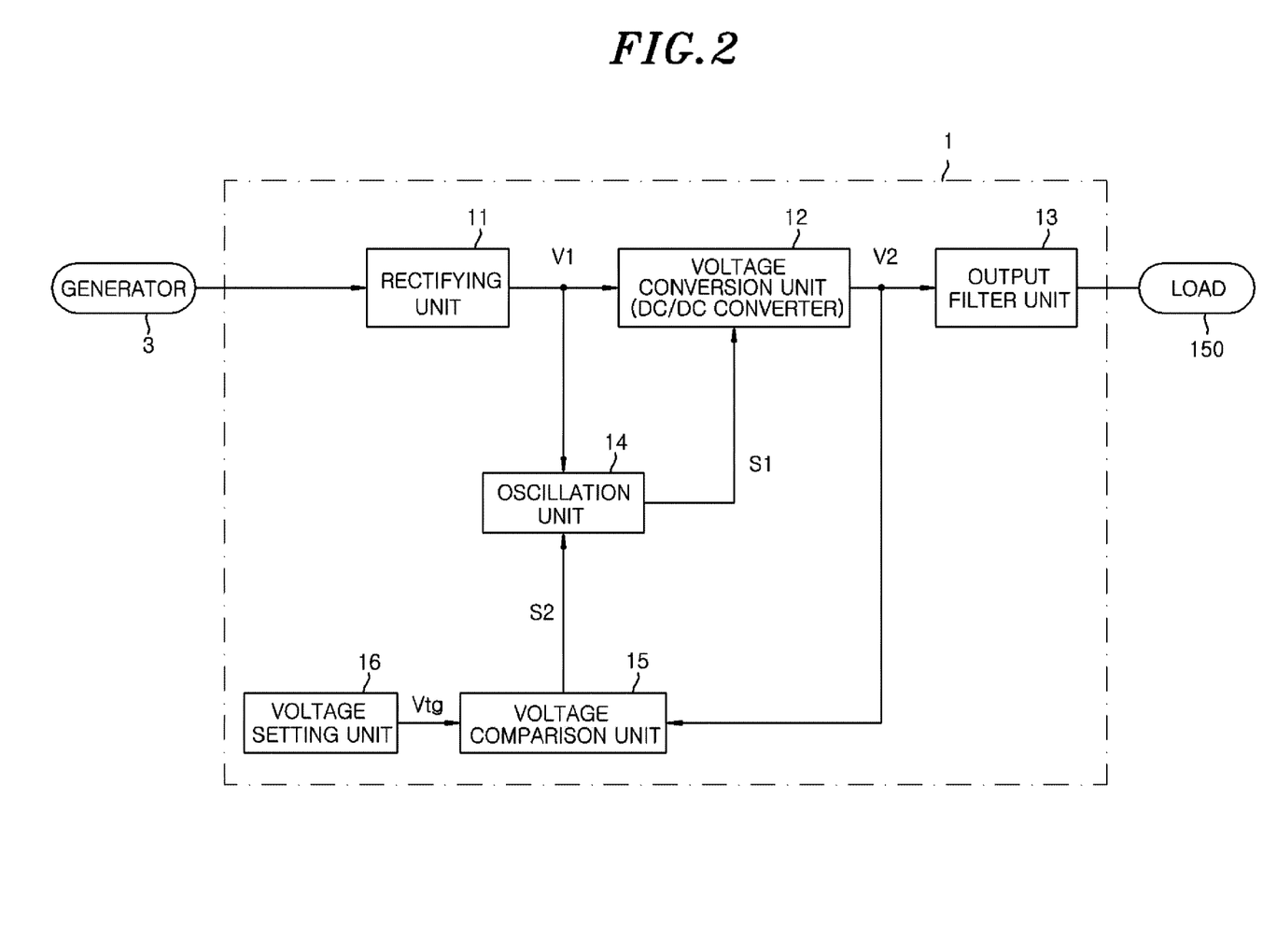
FIG. 2 is a block diagram of the AC/DC converter of the embodiment.

FIG. 2 shows a configuration of the AC/DC converter 1.

The AC/DC converter 1 includes a rectifying unit 11, a voltage conversion unit (DC/DC converter) 12, an output filter unit 13, an oscillation unit 14, a voltage comparison unit 15, and a voltage setting unit 16.

The rectifying unit 11 performs three-phase rectification and smoothing operation on the three-phase AC voltage supplied from the generator 3. That is, the rectifying unit 11 includes a rectifying diode and a smoothing capacitor, and full-wave rectifies and smoothes the AC voltage to output a DC voltage.

The voltage (hereinafter referred to as "input voltage V1") converted into DC power by the rectifying unit 11 is supplied to the voltage conversion unit 12. The voltage conversion unit 12 performs a voltage conversion of the input voltage V1 inputted thereto to obtain a converted voltage (hereinafter referred to as "output voltage V2").

The output voltage V2 is outputted as a DC voltage to a load 150 such as the battery 5 and the like through the output filter unit 13. The output filter unit 13 is, for example, a simple filter composed of a choke coil, a capacitor, and a diode and is provided for the purpose of reducing switching noises, preventing reverse flow when the battery 5 or the like is connected, enabling the load 150 to be connected in parallel, and so on.

In the voltage conversion unit 12, a switching element is used for the voltage conversion. The ON/OFF of the switching element is controlled by a control signal S1 outputted from the oscillation unit 14.

The oscillation unit 14 is, e.g., a square wave oscillation circuit using a comparator as will be described with reference to FIGS. 4 and 5. The oscillation unit 14 outputs the control signal S1 for controlling the switching element based on the input voltage V1 and a comparison signal S2 outputted from the voltage comparison unit 15. Specifically, the oscillation unit 14 is configured to start oscillation when the input voltage V1 reaches a predetermined oscillation start voltage Vst, which will be described with reference to FIGS. 4 and 5. However, an oscillation-stop period is generated by the comparison signal S2.

The oscillation unit 14 outputs the control signal S1 based on the oscillation and oscillation-stop operations, but its oscillation cycle is constant while the duty ratio is changed with the input voltage V1.

The purpose of changing the duty ratio is to make it easier to handle when the input voltage V1 is changed greatly or when the output current is changed greatly.

The voltage comparison unit 15 is configured to compare the output voltage V2 with a set output voltage Vtg of the voltage setting unit 16, and output the comparison signal S2 obtained by the comparison result to the oscillation unit 14. The set output voltage Vtg is a target voltage of the output voltage V2.

The operation of the AC/DC converter 1 will be described with reference to FIGS. 3A to 3E.

Figure 3A:
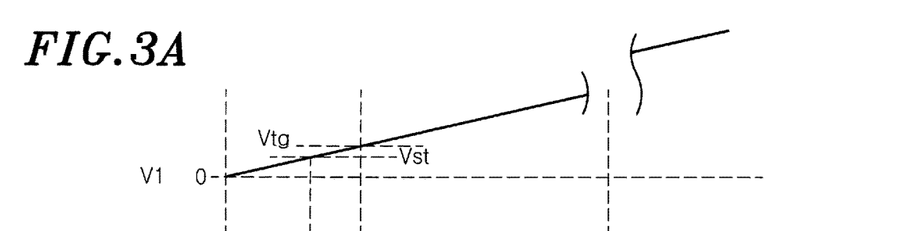
FIGS. 3A to 3E are waveform diagrams of an operation of the AC/DC converter of the embodiment.

FIG. 3A shows the input voltage V1 which increases gradually from 0 V in this example.

Figure 3B:
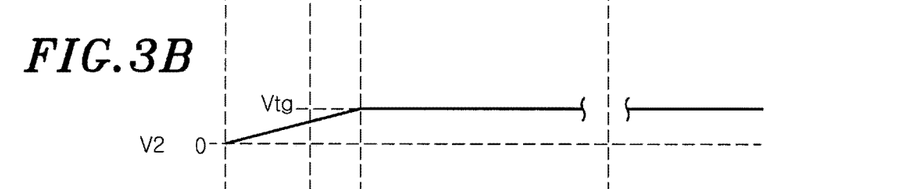

FIG. 3B shows the output voltage V2. In FIG. 3B, the output voltage V2 is equal to the input voltage V1 until the input voltage V1 reaches the set output voltage Vtg, and becomes equal to the set output voltage Vtg by the operation of the voltage conversion unit 12 when the input voltage V1 exceeds the set output voltage Vtg. In FIG. 3B, it is shown that the output voltage V2 is stabilized to be equal to the set output voltage Vtg. However, in practice, there is a variation in the input voltage V1, and this variation is stabilized as shown in FIG. 3B by the control signal S1 controlling the switching element through the voltage comparison unit 15.

Figure 3C:
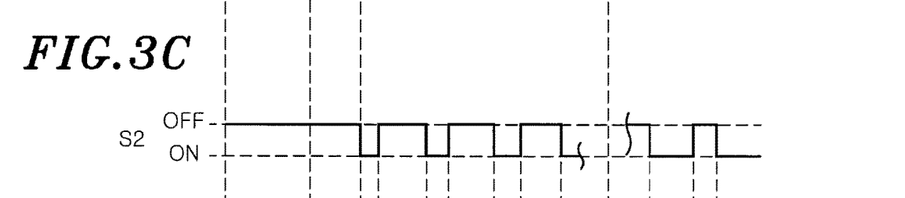

FIG. 3C shows the comparison signal S2 outputted from the voltage comparison unit 15. The voltage comparison unit 15 outputs the comparison signal S2, which has a low level (i.e., 'ON') when the output voltage V2 exceeds the set output voltage Vtg.

Figure 3D:
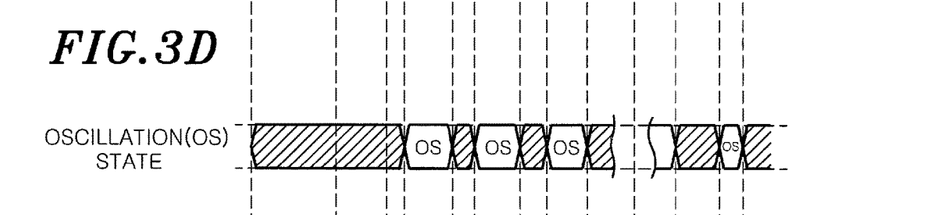

FIG. 3D shows an oscillation state of the oscillation unit 14. In FIG. 3D, a hatched area indicates an oscillation-stop period. Specifically, the oscillation unit stops oscillating, e.g., in a period (from time t0 to time t1) until the input voltage V1 reaches the oscillation start voltage Vst, in a period during which the comparison signal S2 is at the low level and so on.

Figure 3E:
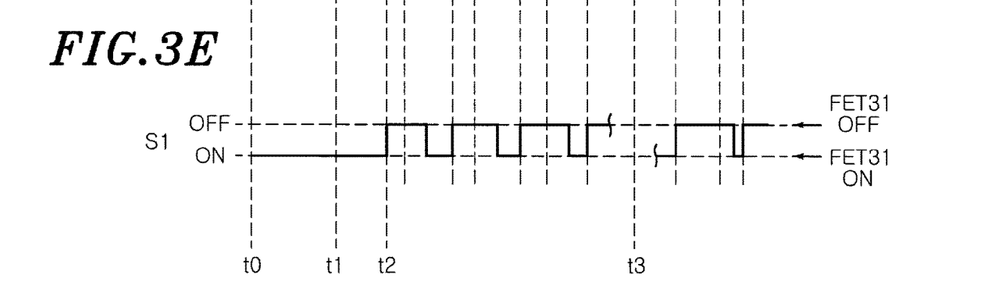

FIG. 3E shows the control signal S1 outputted from the oscillation unit 14. Although the voltage conversion unit is controlled by the control signal S1, the voltage conversion unit 12 does not step down the input voltage V1 and outputs the output voltage V2, which is equal to the input voltage V1, in a period (e.g., from time t0 to time t1) during which the input voltage V1 is lower than the set output voltage Vtg.

Meanwhile, after time t2 at which the input voltage V1 becomes equal to or higher than the set output voltage Vtg, the input voltage V1 is disconnected based on the control signal S1 to stabilize the output voltage V2 to the set output voltage Vtg. Specifically, a turn-off period (cumulative period) of the switching element (FET) becomes longer as the input voltage V1 is higher.

An example of a specific circuit configuration of the AC/DC converter 1 including the aforementioned configuration will be described with reference to FIGS. 4 and 5.

Figure 4:
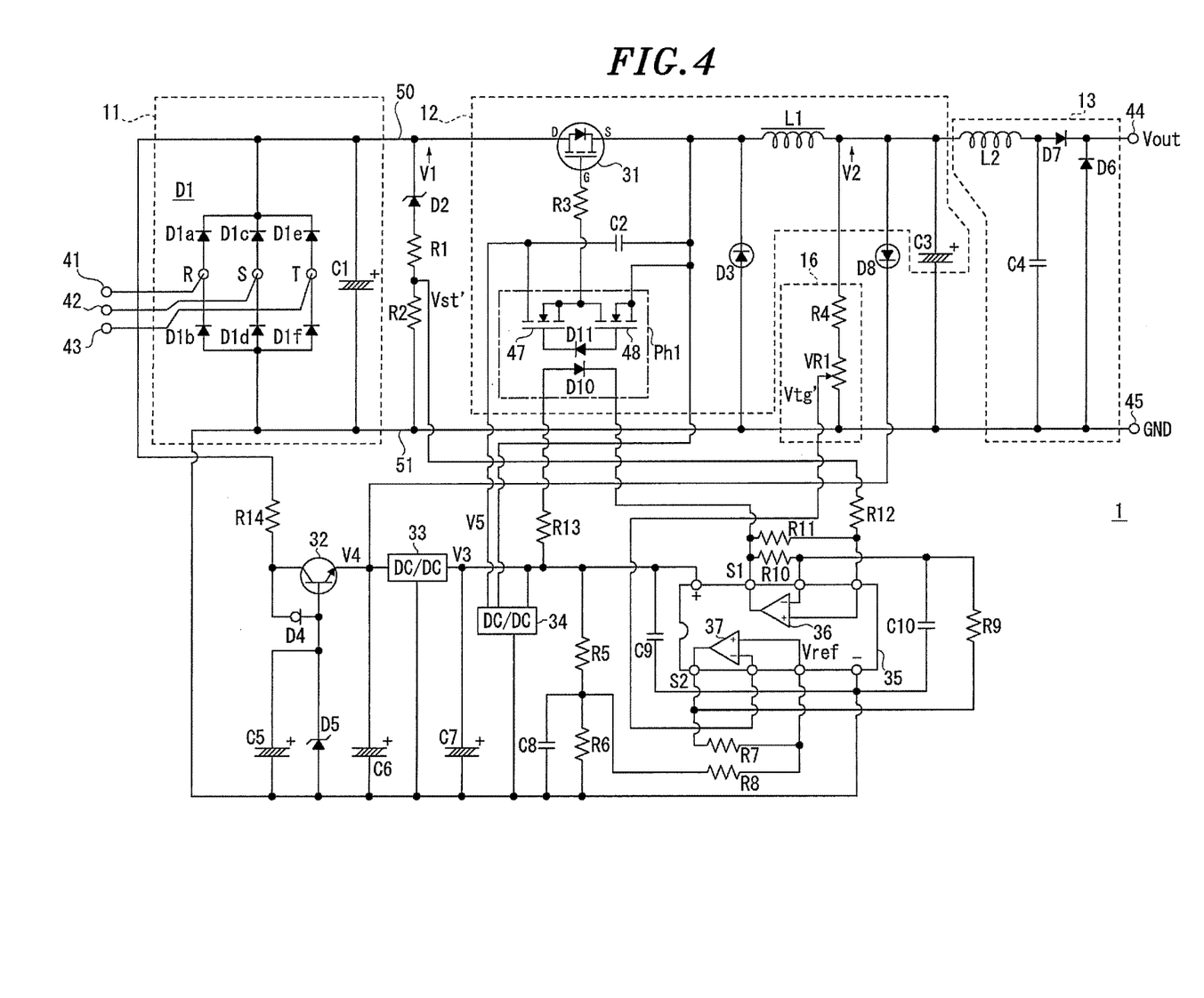
FIG. 4 is a circuit diagram of the AC/DC converter of the embodiment.
Figure 5:
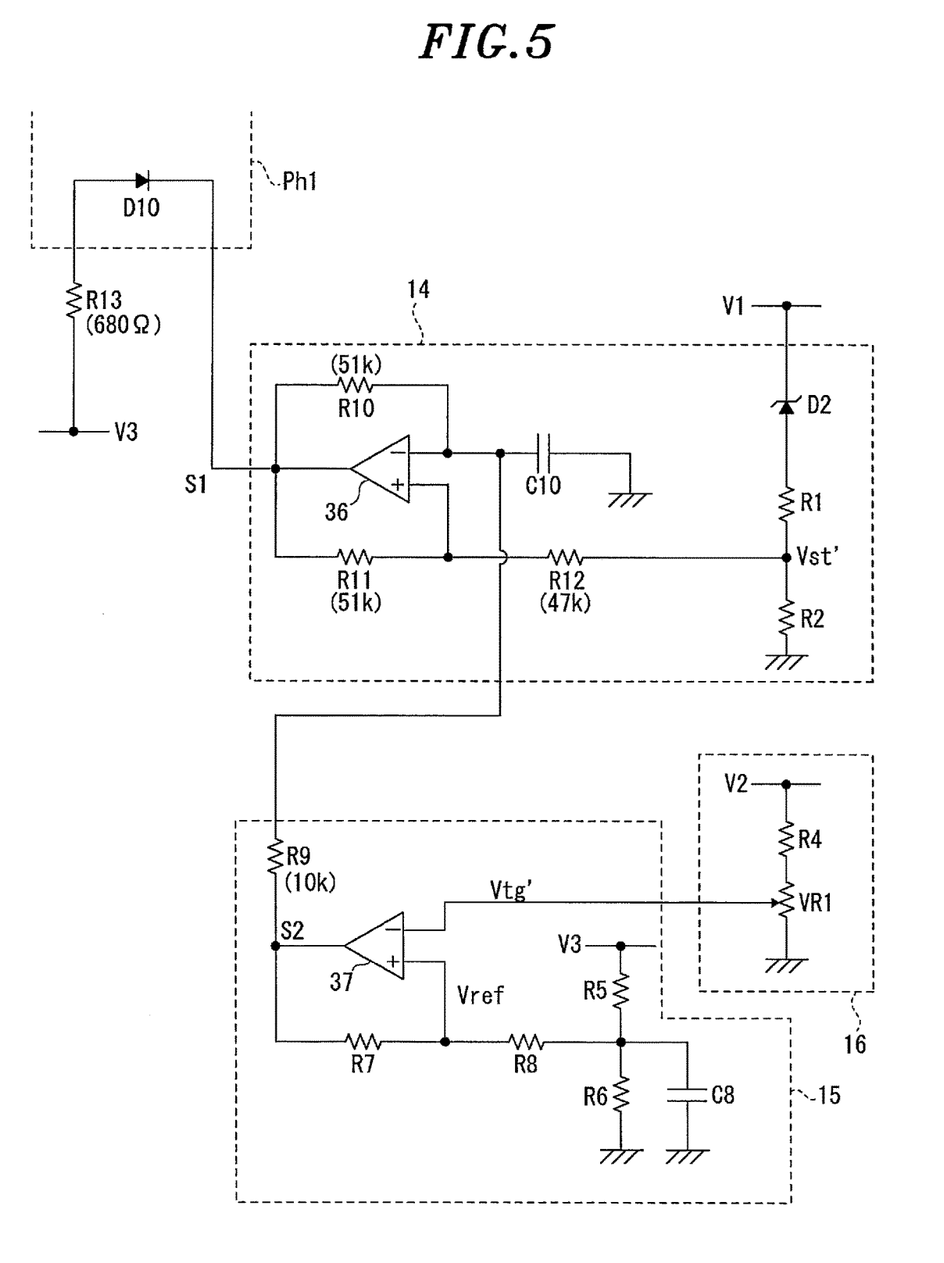
FIG. 5 is a circuit diagram in which a part of the AC/DC converter of the embodiment is extracted.

FIG. 4 shows an example of the entire circuit of the AC/DC converter 1, and FIG. 5 mainly shows the oscillation unit 14, the voltage comparison unit 15 and the voltage setting unit 16 from the entire circuit of FIG. 4.

The three-phase AC voltage from the generator 3 is supplied to terminals 41, 42 and 43 shown in FIG. 4. The inputs from the terminals 41, 42 and 43 are rectified by the rectifying unit 11. The rectifying unit 11 has a smoothing capacitor C1 and a three-phase diode bridge D1 (D1a to D1f) that performs three-phase rectification. The input voltage V1 is obtained as an output of the rectifying unit 11 between a positive electrode line 50 and a negative electrode line 51. The negative electrode line 51 is a ground line.

Further, a zener diode D2 and resistors R1 and R2 are connected in series between the positive electrode line 50 and the negative electrode line 51. As shown in FIG. 5, those components are a part of the oscillation unit 14, and a value of the input voltage V1 which makes the oscillation unit 14 possible to oscillate is set by the resistors R1 and R2. The voltage determined by the resistors R1 and R2 is set as an oscillation start voltage Vst'.

The oscillation start voltage Vst' is a set value on the circuit for the oscillation unit 14 to detect the aforementioned oscillation start voltage Vst. In view of the operation of the oscillation unit 14, the oscillation start voltage Vst' is equivalent to the oscillation start voltage Vst.

The input voltage V1 between the positive electrode line 50 and the negative electrode line 51 is supplied to the voltage conversion unit 12. The voltage conversion unit receives the input voltage V1 and outputs the output voltage V2.

The voltage conversion unit 12 is configured as a step-down DC/DC converter including a field effect transistor (FET) 31 as the switching element, a choke coil L1, a diode D3, a resistor R3, a photo-coupler Ph1 for a switching control, and an output side capacitor C3.

The drain and the source of the FET 31 are disposed on the positive electrode line 50. The gate of the FET 31 is connected to the photo-coupler Ph1 for driving the gate of the FET 31 through the resistor R3.

The photo-coupler Ph1 is an element into which FETs 47 and 48 each of which is an N channel MOS-FET (Metal Oxide Semiconductor-FET), a light emitting diode D10 and a photo-diode D11 are integrated.

The source of the FET 47 and the drain of the FET 48 are connected with each other, and the gate of the FET 31 is connected to the source of the FET 47 and the drain of the FET 48 through the resistor R3.

A capacitor C2 is connected between the drain of the FET 47 and the source of the FET 48. The drain of the FET is connected to a positive output terminal of a DC/DC converter 34, and the source of the FET 48 is connected to a negative output terminal of the DC/DC converter 34.

Between the drain of the FET 47 and the source of the FET 48, a gate drive voltage V5 for the switching drive of the FET 31 serving as the switching element is supplied from the DC/DC converter 34.

The photo-diode D11 is connected between the gate of the FET 48 and the gate of the FET 47.

In the photo-coupler Ph1, when current flows through the light emitting diode D10, current flows through the photo-diode D11 to control the FETs 47 and 48. Accordingly, a gate voltage of the FET 31 is changed. In this example, the FET 31 is turned on when the current flows through the light emitting diode D10.

The choke coil L1 is connected to the source of the FET 31 serving as the switching element, and the cathode of the diode D3 is connected to the contact node between the FET 31 and the choke coil L1. The anode of the diode D3 is connected to the negative electrode line 51.

Further, the capacitor C3 is connected between an output end of the choke coil L1 and the negative electrode line 51.

With such a configuration of the voltage conversion unit 12, the output voltage V2 is obtained on the output side thereof.

The voltage setting unit 16 including a resistor R4 and a variable resistor VR1 is connected in parallel with the capacitor C3. From a center tap of the variable resistor VR1, a set output voltage Vtg' is obtained by a voltage division of the output voltage V2. Therefore, the set output voltage Vtg' can be adjustably changed by the variable resistor VR1. The set output voltage Vtg' is supplied to the voltage comparison unit 15, which will be described later with reference to FIG. 5.

In the block diagram shown in FIG. 2, it is described that the voltage comparison unit 15 compares the set output voltage Vtg with the output voltage V2. However, in the circuit example shown in FIG. 4, the set output voltage Vtg' is obtained by the voltage division of the output voltage V2, and the voltage comparison unit 15 (i.e., a comparator 37) compares the set output voltage Vtg' with a fixed reference voltage Vref to be described later. The comparison between the set output voltage Vtg' and the reference voltage Vref is equivalent to the comparison between the set output voltage Vtg and the output voltage V2.

For the sake of explanation, it is assumed that the set output voltage Vtg is equal to 12 V and the voltage conversion unit 12 operates such that the output voltage V2 is equal to 12 V.

The output voltage V2 outputted from the voltage comparison unit 15 is supplied to the output filter unit 13.

The output filter unit 13 includes a coil L2, a capacitor C4, and diodes D7 and D8.

The output voltage V2 is obtained between output terminals 44 and 45 through the output filter unit 13. The output terminals 44 and 45 are respectively connected to the positive electrode and the negative electrode of the load 150 shown in FIG. 2.

To the positive electrode line 50 at which the input voltage V1 is obtained, a collector of a transistor 32, which is an NPN bipolar transistor, is connected through a resistor R14. A constant-current diode D4 is connected between the collector and a base of the transistor 32, and a cathode of a zener diode D5 is connected to the base of the transistor 32. An anode of the zener diode D5 is connected to the negative electrode line 51. Further, a capacitor C5 is connected between the base of the transistor 32 and the negative electrode line 51.

A capacitor C6 is connected between an emitter of the transistor 32 and the negative electrode line 51, and a voltage V4 at the emitter of the transistor 32 is inputted to the DC/DC converter 33.

Further, a cathode of a diode D8 is connected to the emitter of the transistor 32. To an anode of the diode D8, the output voltage V2 outputted from the voltage conversion unit 12 is applied.

The DC/DC converter 33 generates and outputs a constant operation voltage V3 (e.g., 5 V) from the input voltage V4.

In this configuration, the voltage V4 based on the input voltage V1 is supplied to the DC/DC converter 33 until the output voltage V2 reaches, e.g., 12 V. In other words, in a period during which the input voltage V1 is low and the output voltage V2 does not reach 12 V, the transistor 32 is turned on and the voltage V4 at the emitter of the transistor 32 becomes the input voltage of the DC/DC converter 33.

When the output voltage V2 reaches 12 V, the zener diode D5 whose zener voltage is set to 12 V is conducted. As a result, the base and the emitter of the transistor 32 have the same potential, so that the transistor 32 is turned off. In this state, the output voltage V2 is supplied through the diode D8 and becomes the voltage V4 inputted to the DC/DC converter 33.

A capacitor C7 is connected between the output side of the DC/DC converter 33 and the negative electrode line 51.

The operation voltage V3, which is the output of the DC/DC converter 33, is supplied to a positive power supply terminal of an IC 35 as the operation voltage of the IC 35. The IC 35 is a single-supply dual comparator including comparators 36 and 37. A negative power supply terminal of the IC 35 is connected to the negative electrode line 51.

Further, the operation voltage V3 is also supplied to the small DC/DC converter 34. The DC/DC converter 34 converts the operation voltage V3 to generate the gate drive voltage V5 for the switching drive of the FET 31.

The DC/DC converter 34 is provided for securing the gate drive voltage V5 at an early stage. For example, when the operation voltage V3 reaches a DC voltage of 5 V, the DC/DC converter 34 generates the gate drive voltage V5 of 12 V. The DC output operation of the DC/DC converter 34 is started when the operation voltage V3 exceeds a value of 3 V.

Further, to the line of the operation voltage V3, an anode of the light emitting diode D10 of the photo-coupler Ph1 is connected through a resistor 13. A cathode of the light emitting diode D10 is connected to an output terminal of the comparator 36.

The operation voltage V3 is divided by resistors R5 and R6. The divided voltage is supplied as a reference voltage Vref to a positive (+) input terminal (non-inverting input terminal) of the comparator 37 through a resistor R8. Further, in order to remove noise, a capacitor C8 is connected between a connection node of the resistors R5 and R6 and the negative electrode line 51.

Further, a resistor R7 is connected between the output terminal and the non-inverting input terminal of the comparator 37.

The set output voltage Vtg' described earlier is supplied to a negative (−) input terminal (inverting input terminal) of the comparator 37.

The output of the comparator 37 is the comparison signal S2. An output terminal of the comparator 37 is connected to an inverting input terminal of the comparator 36 through a resistor R9.

A capacitor C9 is connected between the positive power supply terminal and the negative power supply terminal of the IC 35.

A resistor R10 is connected between the inverting input terminal and the output terminal of the comparator 36, and a capacitor C10 is connected between the inverting input terminal and the negative electrode line 51.

A resistor R11 is connected between the non-inverting input terminal and the output terminal of the comparator 36, and a resistor R12 is connected between the non-inverting input terminal of the comparator 36 and the connection node of the resistors R1 and R2.

The operation of the AC/DC converter 1 will be described with reference to FIGS. 3A to 3E and FIG. 5 which mainly shows the oscillation unit 14, the voltage comparison unit 15, and the voltage setting unit 16 from the above configurations.

First, the set output voltage Vtg' is supplied to the inverting input terminal of the comparator 37 of the voltage comparison unit 15, and the reference voltage Vref is supplied to the non-inverting input terminal of the comparator 37 of the voltage comparison unit 15. Then, the comparator 37 of the voltage comparison unit 15 outputs the comparison signal S2 as the comparison result. Specifically, when the output voltage V2 exceeds the predetermined set output voltage Vtg (see FIGS. 3A to 3E), the output of the comparator 37 is set to have a relationship that the set output voltage Vtg' is greater than the reference voltage Vref (i.e., Vtg'>Vref). In this case, the comparison signal S2 from the comparator 37 becomes a low level (ON). When the output voltage V2 is lower than the predetermined set output voltage Vtg, the comparison signal S2 becomes a high level (OFF).

The comparator 36 of the oscillation unit 14 is configured as an oscillation circuit with a time constant determined by the resistor R10 and the capacitor C10 connected to the inverting input terminal thereof. The control signal S1 outputted from the comparator 36 is a signal having an oscillation frequency determined by the time constant of this oscillation circuit.

The oscillation start voltage Vst' is set by the resistors R1 and R2. When the input voltage V1 reaches the oscillation start voltage Vst, the oscillation of the oscillation unit 14 is started. The oscillation start voltage Vst' is set such that the oscillation is started when the input voltage V1 is in a range from 2 V to 3 V, for example.

Further, a threshold is set by the resistors R11 and R12. For example, the threshold is set to be compared with a triangular wave generated by the oscillation circuit and, as a result of the comparison, the control signal S1 is outputted as a rectangular wave oscillation signal.

As an example, R13, R10, R11, R12 and R9 are set equal to 680Ω, 51Ω, 51Ω, 47Ω, and 10Ω, respectively.

Here, an operation between the time t0 at which the input voltage V1 is 0 V and the time t1 when the input voltage V1 is gradually increased from the time t0 as shown in FIGS. 3A to 3E will be described. In other words, the operation in a period during which the input voltage V1 has not reached the oscillation start voltage Vst will be described.

Further, the operation is executed on an assumption that the operation voltage V3 of, e.g., 5 V serves as a power supply voltage when the input voltage V1 is lower than the set output voltage Vtg.

In the comparator 37 of the voltage comparison unit 15 during this period, the voltage (i.e., the set output voltage Vtg') of the inverting input terminal is lower than the voltage (i.e., the reference voltage Vref) of the non-inverting input terminal. Thus, the comparison signal S2 is maintained in an OFF (open-circuit) state.

Further, during this period, the oscillation of the oscillation unit 14 is not performed.

Since the operation voltage V3 is supplied to the anode of the light emitting diode D10 of the photo-coupler Ph1, current flows through the light emitting diode D10. That is, the current flows through a path: the operation voltage V3 (power supply of DC 5 V)→the resistor R13→the light emitting diode D10→the resistor R10→the capacitor C10. As the current flows through the above path, the voltage of the inverting input terminal becomes higher than the voltage of the non-inverting terminal in the comparator of the oscillation unit 14. Thus, the output of the comparator 36 is maintained at a low level (short-circuit) while the oscillation is stopped.

Accordingly, the FET 31 is kept turned on, and thus the output voltage V2 is the same as the input voltage V1.

An operation for a period between the time t1 and the time t2, which is a period after the input voltage V1 is further increased and reaches the oscillation start voltage Vst, is described as follows.

Even though the output voltage V2 is lower than the set output voltage Vtg, the oscillation unit 14 starts oscillating when the input voltage V1 exceeds the oscillation start voltage Vst.

However, by setting the oscillation start voltage Vst (i.e., setting of Vst') closer to the set output voltage Vtg (i.e., setting of Vtg'), it is possible to maintain the oscillation-stop-state until the output voltage V2 reaches the set output voltage Vtg. FIGS. 3A to 3E show this state in which the oscillation is not started by employing the above setting.

Therefore, the control signal S1, which is the output of the oscillation unit 14 (the comparator 36), is maintained at the low level (ON), the current flows through the light emitting diode D10, and the FET 31 is kept turned on. Therefore, the output voltage V2 is the same as the input voltage V1.

An operation after the time t2 at which the output voltage V2 reaches the set output voltage Vtg is described as follows. When the output voltage V2 exceeds the set output voltage Vtg, the voltage (i.e., the set output voltage Vtg') of the inverting input terminal becomes higher than the voltage (i.e., the reference voltage Vref) of the non-inverting input terminal in the comparator 37 of the voltage comparison unit 15. Thus, the comparison signal S2 becomes the low level (ON).

Here, the output terminal of the comparator 37 is connected to the inverting input terminal of the comparator 36 of the oscillation unit 14 through the resistor R9. In other words, when the comparison signal S2 becomes the low level, the inverting input terminal of the comparator 36 (i.e., the oscillation circuit) is pulled down to the low level (e.g., the ground level), so that the oscillation of the oscillation unit 14 is stopped.

In other words, when the output voltage V2 becomes high and the comparison signal S2 becomes the low level (ON), the oscillation of the oscillation unit 14 is stopped. At this time, the voltage of the inverting input terminal of the comparator 36 becomes lower than the voltage of the non-inverting input terminal of the comparator 36. Thus, the output terminal of the comparator 36 is maintained to be open-circuited.

In this case, since no current flows through the light emitting diode D10 of the photo-coupler Ph1, the FET 31 is turned off.

Further, the resistances of the resistors R10 and R9 are respectively set equal to 51 kΩ and 10 kΩ, which are higher than the resistance of R13 set equal to 680Ω as described above. Therefore, not enough current flows to turn on the light emitting diode D10 although the comparator 37 of the voltage comparison unit 15 is in the 'ON' state (i.e., the low level), and the FET is not turned on. This is because the output terminal of the comparator 36 is open-circuited and the voltage across the light emitting diode D10 is equal to or lower than the threshold even when considering the current path through the resistor R10.

Since the FET 31 is turned off, the output voltage V2 is decreased.

When the output voltage V2 becomes lower than the set output voltage Vtg, the comparison signal S2 becomes the high level (OFF) and the oscillation of the oscillation unit 14 is started. The ON/OFF control of the FET 31 is finely performed by the control signal S1 outputted from the oscillation unit 14.

Here, the threshold applied to the non-inverting input terminal of the comparator 36 varies in response to the input voltage V1.

Therefore, during the oscillation, the duty ratio of the high level (OFF) to the low level (ON) of the control signal S1 is changed based on the input voltage V1.

Specifically, as shown in FIGS. 3A to 3E, when the input voltage V1 is slightly higher than the set output voltage Vtg, the low level (ON) period of the control signal S1 is relatively long. Meanwhile, when the input voltage V1 is considerably higher than the set output voltage Vtg (e.g., after the time t3), the low level (ON) period of the control signal S1 becomes shorter. That is, the period during which the FET 31 is turned on (i.e., ON-time within the unit period) becomes shorter as the input voltage V1 is higher.

In other words, when the input voltage V1 becomes considerably higher than the set output voltage Vtg, the oscillation is stopped and the FET 31 is turned off in response to the rise of the output voltage V2. Further, the OFF period during the oscillation is set to be longer. Therefore, it becomes possible to make it easier to stabilize the output voltage V2 to the set output voltage Vtg.

The AC/DC converter 1 according to the above-described embodiment includes the rectifying unit 11 configured to rectify an AC input voltage and the switching element (i.e., the FET 31). The AC/DC converter 1 further includes the voltage conversion unit 12, which is configured to receive the input voltage V1 rectified by the rectifying unit 11 and obtain the output voltage V2 voltage-converted by the switching operation of the FET 31. In addition, the AC/DC converter 1 also includes the voltage comparison unit 15 configured to generate the comparison signal S2 between the output voltage V2 and the set output voltage Vtg, and the oscillation unit 14. The oscillation unit 14 is configured to output the control signal S1 having the oscillation period and the oscillation-stop period as a control signal for controlling the ON/OFF of the FET 31. The oscillation period and the oscillation-stop period of the control signal S1 are controlled by the comparison signal S2 outputted from the voltage comparison unit 15, and the pulse duty ratio of the control signal S1 in the oscillation period is variably controlled based on the input voltage V1.

That is, with respect to the control signal S1 for controlling the ON/OFF of the switching element (the FET 31), the oscillation period is controlled in response to the output voltage V2 while the pulse duty ratio is controlled in response to the input voltage V1. Therefore, it becomes possible to cope with a wide range of the input voltages.

With such a configuration of the above-described AC/DC converter 1, it is possible to realize an AC/DC converter which can be used as a so-called regulator rectifier.

When using the AC/DC converter as the regulator rectifier, an input range from AC 0 V to AC 100 V or more is required and a more stable output voltage is required for the control accuracy of the output voltage. These requirements can be realized by using the AC/DC converter 1 in the above-described embodiment.

As previously described, when the AC/DC converter is configured to respond to the wide range of the input voltages, the load on the peripheral elements becomes larger when the DC/DC converter performs the voltage control only by the PWM control of the switching element.

However, in the case of the AC/DC converter according to the above-described embodiment, the load on the peripheral elements due to the pulse current can be reduced by controlling the output voltage V2 by varying, in response to the input voltage V1, the period during which the driving of the FET 31 of the voltage conversion unit 12 (DC/DC converter) is stopped.

In addition, the accuracy of the output voltage control is improved by further applying hysteresis control (control of the pulse duty ratio) to the driving of the FET 31 of the voltage conversion unit 12 while detecting the fluctuation of the output voltage V2.

Further, in the example of JP H01-148072A, a plurality of FETs are used to control the input voltage of the DC/DC converter to cope with a wide range of input voltages. However, in the above-described embodiment, one FET 31 can be used to cope with the wide range of input voltages.

When a power generation of the generator 3 is started, the output voltage V2 can be outputted by using a small voltage. This is because when the input voltage V1 is equal to or lower than the set output voltage Vtg, the output of the rectifying unit 11 itself can be used as the output voltage V2.

Further, when the output voltage V2 exceeds the set output voltage Vtg, the voltage comparison unit 15 of the above-described embodiment outputs the comparison signal S2 for causing the control signal S1 of the oscillation unit 14 to be in a state of the oscillation-stop period. In this oscillation-stop period, the FET 31 is controlled to be turned off.

Accordingly, stabilizing the output voltage V2 to the set output voltage Vtg can be realized by lowering the output voltage V2 in response to the rise of the output voltage V2.

Further, in the above-described embodiment, a period (e.g., from the time t0 to the time t1) during which the input voltage V1 does not reach the oscillation start voltage Vst is the oscillation-stop period, and the FET 31 is turned on in this period.

Further, in the case where the input voltage V1 exceeds the set output voltage Vtg, the inverting input terminal of the comparator 36 is set to 0 V (ground potential) when the output voltage V2 exceeds the set output voltage Vtg, and this period becomes the oscillation-stop period. However, in this period, the FET 31 is turned off.

In other words, when the oscillation is stopped, the FET may be turned on or off. When the input voltage V1 does not reach the oscillation start voltage Vst, the FET 31 is continuously turned on while the oscillation is stopped. Thus, it is suitable for quickly increasing the output voltage V2. Then, when the output voltage V2 exceeds the set output voltage Vtg, the FET 31 is continuously turned off while the oscillation is stopped. Thus, the voltage rise is effectively suppressed and it becomes suitable for the stabilization.

Further, the oscillation unit 14 includes the comparator that compares the oscillation signal determined by the oscillation time constant circuit having the resistor R10 and the capacitor C10 with a threshold to output a rectangular wave oscillation signal as a control signal during the oscillation period. When the output voltage V2 exceeds the set output voltage Vtg, the comparison signal S2 serves as a signal for setting the input terminal (i.e., the inverting input terminal) of the oscillation signal of the comparator 36 to a lower potential than the input terminal (i.e., the non-inverting input terminal) of the threshold of the comparator 36.

In the case where the control signal S1 is outputted by the comparator 36 for comparing the output of the oscillation time constant circuit with the threshold (the potential at the connection node of R11 and R12), the oscillation output can be stopped by setting the inverting input terminal to which the oscillation signal is inputted to the potential (e.g., the ground potential) which is lower than that of the non-inverting input terminal to which the threshold is inputted.

In this configuration, it is possible to rapidly perform the stop and restart of the oscillation, and it is also suitable for the stabilization control of the output voltage V2.

In addition, the oscillation unit 14 variably controls the pulse duty ratio in the oscillation period of the control signal S1 by changing the threshold (i.e., the non-inverting input terminal voltage of the comparator 36) based on the input voltage V1. Particularly, in the circuit of the above-described embodiment, the threshold is set by dividing the input voltage V1. This makes it easier to control the pulse duty ratio according to the input voltage V1.

Although the AC/DC converter 1 according to the embodiment has been described above, the circuits shown in FIGS. 4 and 5 are merely examples, and other circuit examples may be employed.

Further, the power supply device of the present disclosure can be widely applied to a power generation system other than the power generation system shown in FIG. 1.

While the invention has been shown and described with respect to the embodiments, it will be understood by those skilled in the art that various changes and modification may be made without departing from the scope of the invention as defined in the following claims.

What is claimed is:

1. A power supply device comprising:
   a rectifying unit configured to rectify an AC input voltage;
   a voltage conversion unit including a switching element and configured to receive a rectified input voltage from the rectifying unit and obtain an output voltage voltage-converted by a switching operation of the switching element;
   a voltage comparison unit configured to generate a comparison signal between the output voltage and a set output voltage; and
   an oscillation unit configured to output a control signal having an oscillation period and an oscillation-stop period as a control signal for controlling an ON/OFF of the switching element, wherein the oscillation period and the oscillation-stop period of the control signal are controlled by the comparison signal outputted from the voltage comparison unit, and a pulse duty ratio of the control signal in the oscillation period is variably controlled based on the input voltage.

2. The power supply device of claim 1, wherein when the output voltage exceeds the set output voltage, the voltage comparison unit outputs the comparison signal to cause the control signal of the oscillation unit to be in a state of the oscillation-stop period, and the switching element is controlled to be turned off in the oscillation-stop period.

3. The power supply device of claim 1, wherein the oscillation unit includes a comparator which is configured to compare an oscillation signal determined by an oscillation time constant circuit with a threshold to output a rectangular wave oscillation signal as a control signal during the oscillation period, and
   wherein when the output voltage exceeds the set output voltage, the comparison signal serves as a signal for setting an input terminal of the oscillation signal of the comparator to a lower potential than an input terminal of the threshold of the comparator.

4. The power supply device of claim 2, wherein the oscillation unit includes a comparator which is configured to compare an oscillation signal determined by an oscillation time constant circuit with a threshold to output a rectangular wave oscillation signal as a control signal during the oscillation period, and wherein when the output voltage exceeds the set output voltage, the comparison signal serves as a signal for setting an input terminal of the oscillation signal of the comparator to a lower potential than an input terminal of the threshold of the comparator.

5. The power supply device of claim 1, wherein the oscillation unit includes a comparator which is configured to compare an oscillation signal determined by an oscillation time constant circuit with a threshold to output a rectangular wave oscillation signal as a control signal during the oscillation period, and wherein the oscillation unit variably controls the pulse duty ratio in the oscillation period of the control signal by changing the threshold based on the input voltage.

6. The power supply device of claim 2, wherein the oscillation unit includes a comparator which is configured to compare an oscillation signal determined by an oscillation time constant circuit with a threshold to output a rectangular wave oscillation signal as a control signal during the oscillation period, and wherein the oscillation unit variably controls the pulse duty ratio in the oscillation period of the control signal by changing the threshold based on the input voltage.

7. The power supply device of claim 3, wherein the oscillation unit variably controls the pulse duty ratio in the oscillation period of the control signal by changing the threshold based on the input voltage.

8. The power supply device of claim 4, wherein the oscillation unit variably controls the pulse duty ratio in the oscillation period of the control signal by changing the threshold based on the input voltage.

* * * * *

UNITED STATES PATENT AND TRADEMARK OFFICE
CERTIFICATE OF CORRECTION

PATENT NO. : 10,103,642 B2
APPLICATION NO. : 15/599493
DATED : October 16, 2018
INVENTOR(S) : Motoi Nakajima It is certified that error appears in the above-identified patent and that said Letters Patent is hereby corrected as shown below:

On the Title Page

Item (73) "FUTABA CORPORATION, Osaka (JP)" to --FUTABA CORPORATION, Mobara-shi (JP); O.S. ENGINES MFG. CO., LTD., Osaka (JP)--.

Signed and Sealed this
Seventeenth Day of March, 2020

Andrei Iancu
*Director of the United States Patent and Trademark Office*